United States Patent
Wu et al.

(10) Patent No.: US 9,687,104 B2
(45) Date of Patent: Jun. 27, 2017

(54) CIRCULATOR COOKER

(71) Applicants: Jeff Wu, Stafford, TX (US); Frank Wu, Stafford, TX (US)

(72) Inventors: Jeff Wu, Stafford, TX (US); Frank Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 986 days.

(21) Appl. No.: 13/935,971

(22) Filed: Jul. 5, 2013

(65) Prior Publication Data

US 2016/0022085 A1    Jan. 28, 2016

Related U.S. Application Data

(60) Provisional application No. 61/764,984, filed on Feb. 14, 2013.

(51) Int. Cl.
*A47J 27/00* (2006.01)
*A47J 37/12* (2006.01)
(Continued)

(52) U.S. Cl.
CPC ............... *A47J 27/10* (2013.01); *H05B 3/80* (2013.01); *A47J 27/18* (2013.01); *A47J 36/20* (2013.01); *A47J 45/068* (2013.01)

(58) Field of Classification Search
CPC ........ A47J 27/10; A47J 36/2405; A47J 36/32; A47J 27/18; A47J 45/068; A47J 36/20; H05B 3/80; A23L 1/0121; A23V 2002/00
(Continued)

(56) References Cited

U.S. PATENT DOCUMENTS 3,270,661 A * 9/1966 Juvan ................. A47J 29/02
                                                99/343
3,273,717 A * 9/1966 Canterbury .......... A01K 63/045
                                                210/167.26

(Continued)

FOREIGN PATENT DOCUMENTS

EP    2354738       8/2011
EP    2354738 A2    8/2011
(Continued)

OTHER PUBLICATIONS

J. Kenji Lopez-Alt: "Is The Nomiku Portable Sous-Vide Cooker The Solution We're Looking For?"; Serious Eats, Jun. 28, 2012; 2 pp. From the Internet: http://www/seriouseats.com/2012/06/is-the-nomiku-portable-sous-vide-cooker-the-s.html.
(Continued)

*Primary Examiner* — Quang D Thanh
*Assistant Examiner* — Hemant Mathew
(74) *Attorney, Agent, or Firm* — Polsinelli P.C.

(57) ABSTRACT

A sous-vide circulator cooker for home sous-vide cooking. The sous-vide circulator cooker is particularly suited for use in home kitchens and on small countertops. The sous-vide circulator cooker includes a detachable stainless steel skirt which allows for cleaning the skirt itself and cleaning of a heater and pump covered by the skirt. The provision of a stainless steel skirt can also act to ensure that no plastic components are directly wetted during use of the cooker. In at least one embodiment, the sous-vide circulator cooker's removable skirt also exposes the water pump impellers allow users to clean out food and debris.

10 Claims, 2 Drawing Sheets

(51) Int. Cl.
*A47J 43/28* (2006.01)
*A47J 27/10* (2006.01)
*H05B 3/80* (2006.01)
*A47J 36/20* (2006.01)
*A47J 45/06* (2006.01)
*A47J 27/18* (2006.01)

(58) Field of Classification Search
USPC .................... 99/330, 342, 403, 343, 344
See application file for complete search history.

(56) References Cited

U.S. PATENT DOCUMENTS

| | | | | |
|---|---|---|---|---|
| D214,165 S | * | 5/1969 | Sesholtz | D23/316 |
| 4,045,606 A | * | 8/1977 | Kalkowski | F24C 15/00 |
| | | | | 219/445.1 |
| 5,336,401 A | * | 8/1994 | Tu | A01K 63/045 |
| | | | | 119/261 |
| 5,401,401 A | * | 3/1995 | Hickok | A01K 63/045 |
| | | | | 119/259 |
| 6,079,486 A | * | 6/2000 | Cennamo | H01L 23/4093 |
| | | | | 165/185 |
| 2009/0087534 A1 | * | 4/2009 | McLemore | A47J 37/1209 |
| | | | | 426/523 |
| 2009/0153490 A1 | * | 6/2009 | Nymark | H04M 1/72519 |
| | | | | 345/169 |
| 2010/0154656 A1 | * | 6/2010 | Yamamoto | F24C 15/327 |
| | | | | 99/467 |
| 2011/0088564 A1 | * | 4/2011 | Bonsell | A47J 29/04 |
| | | | | 99/336 |
| 2011/0117259 A1 | * | 5/2011 | Storek | A23L 1/0128 |
| | | | | 426/509 |
| 2011/0185915 A1 | * | 8/2011 | Eades | A47J 27/004 |
| | | | | 99/331 |
| 2011/0186283 A1 | * | 8/2011 | Preston | B01L 7/02 |
| | | | | 165/287 |

FOREIGN PATENT DOCUMENTS

| | | |
|---|---|---|
| EP | 2407703 A2 | 1/2012 |
| JP | S63196984 U | 12/1988 |
| JP | 2006334208 | 12/2006 |
| JP | 2008043502 | 2/2008 |
| KR | 20120049118 A | 5/2012 |
| WO | 2012156890 | 11/2012 |

OTHER PUBLICATIONS

News Anova Inc. Water Bath Company, May 7, 2014. From the Internet: http://www.waterbaths.com/news.html.
Studio Kitchen; "Anova Immersion Circulator", May 8, 2014; 8 pp. From the Internet: http://www.studiokitchen.com/studio-kitchen/anova-immersion-circulator.
European Patent Office Extended Search Report dated May 14, 2014, for European Patent Application No. EP 14154528.5-1808.
Notification of Reason for Refusal mailed Mar. 31, 2015; in Japanese patent application No. 2014-025539.
English abstract for JP2006334208; published Dec. 14, 2006.
English abstract for JP2008043502; published Feb. 28, 2008.

* cited by examiner

CIRCULATOR COOKER

CROSS-REFERENCE TO RELATED APPLICATION

This application claims priority to U.S. provisional application No. 61/764,984, filed Feb. 14, 2013, which is fully incorporated by reference herein.

FIELD OF TECHNOLOGY

The present disclosure relates generally to food cooking devices, and more specifically, to precision temperature control water heater and water pump circulator appliance for cooking food in water.

BACKGROUND

Sous-vide is a method of cooking food sealed in airtight plastic bags in a water bath for longer than normal cooking times at an accurately regulated temperature much lower than normally used for cooking, typically around 45° C. (113° F.) to 85° C. (185° F.) for meats and higher for vegetables. Current home low cost cookers do not agitate the cooking water and are thus essentially a heater within a tank. Other cookers tend to agitate the cooking water using an air circulation device causing accelerated water evaporation.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Figure 1:
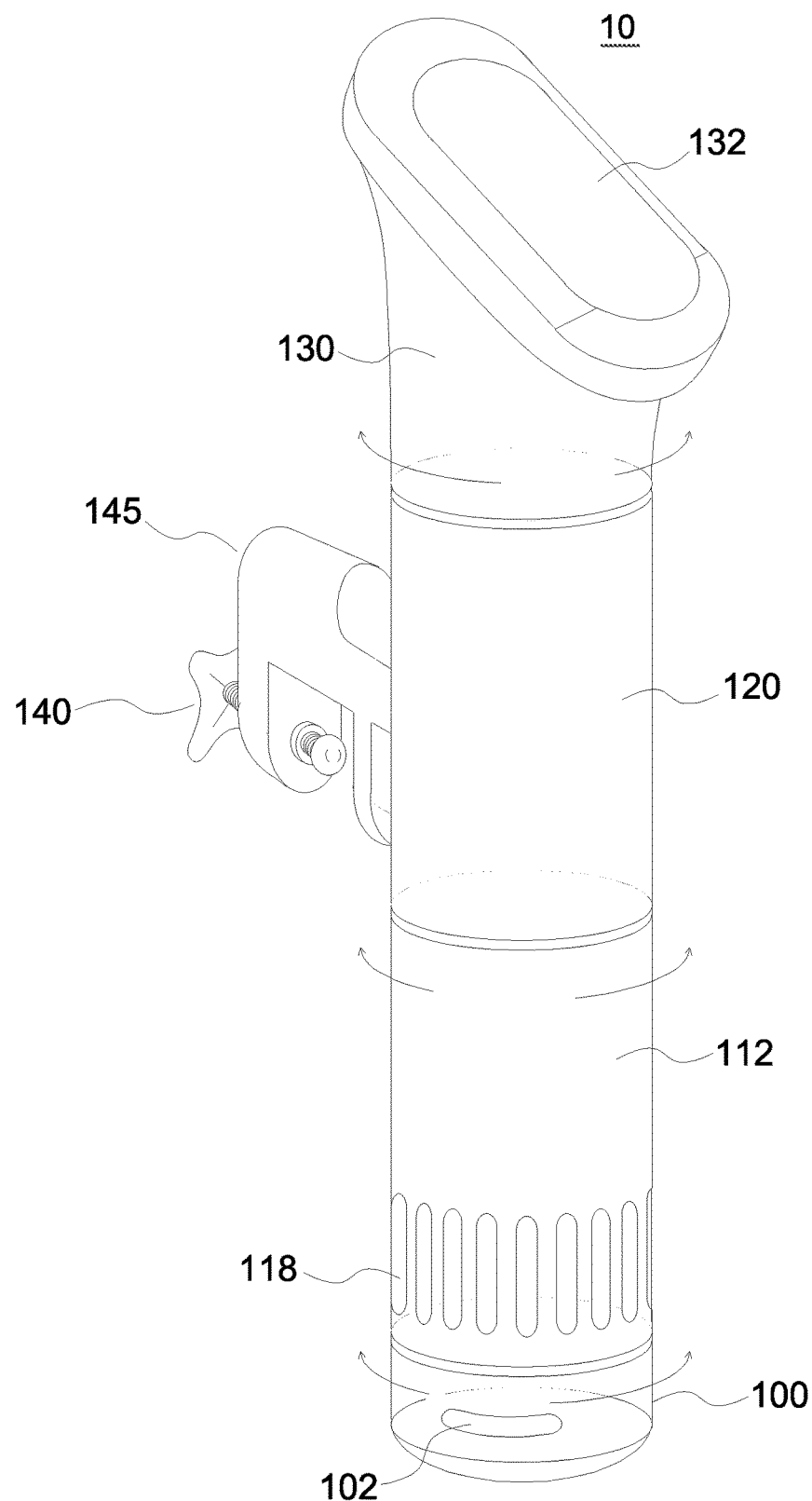
FIG. 1 is a fluidic temperature control device in accordance with an example embodiment.

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Several definitions that apply throughout this document will now be presented. "Circulating" means agitating, blending or mixing of one or more fluids. Hence a "circulator" is a device which can be configured to agitate, blend or mix a fluid. Fluids will be understood to comprise liquids. "Coupled" is defined as connected, whether directly or indirectly through intervening components and is not necessarily limited to physical connections. Coupled devices are devices which are in signal communication with one another. "Connected" means directly connected or indirectly connected.

Broadly speaking, this disclosure relates to a sous-vide circulator cooker for home sous-vide cooking. The disclosed devices are particularly suited for use in home kitchens and small countertops.

In at least one embodiment, a sous-vide circulator cooker has a turnable or rotatable information display and control head. The control head is configured to keep electronics housed therein away from steam and to enable easy viewing from different angles.

In at least one embodiment, a sous-vide circulator cooker includes a detachable single or dual-section stainless steel skirt which allows for cleaning the skirt itself and cleaning of a heater and pump covered by the skirt. The provision of a stainless steel skirt can also act to ensure that no plastic components are directly wetted during use of the cooker. In at least one embodiment, the sous-vide circulator cooker's removable skirt also exposes the water pump impellers allow users to clean out food and debris in case of bag breakage.

In at least embodiment a sous-vide circulator cooker includes a Wi-Fi/Blue tooth radio for recipe specification uploads from phone, tablet or PC and direct remote control and monitoring. Thus, in at least one embodiment of this disclosure a fluidic temperature controller can include a non-volatile memory that stores a plurality of recipe specifications and user generated data files as well as a control interface that enables a user of the sous-vide circulator cooker to select and recall recipe specifications. In at least one embodiment of this disclosure, a sous-vide circulator cooker can search for recipes that match certain specification criteria.

In another embodiment, the system interface has dynamically color changing, icons, objects or background to notify operator of system temperature and tank water level. Additionally the controller may contain a speaker to sound music alarms and reminders.

According to one aspect of this disclosure, a sous-vide circulator cooker can rotate the head controller. Storing most microelectronics within such a rotatable structure enables the microelectronics to be located away from the steam source. An interface on the head controller can also turn to enable a user to adjust a viewing angle.

FIG. 1 illustrates an example embodiment of a fluidic temperature control device 10. The temperature control device 10 comprises a head portion 130, a middle portion 120, and a lower portion 112. The lower portion 112 can also include a pump housing 100. The middle portion 120 includes a motor 122 and heater base 123. The head portion 130 can include a display device 132 which can display information such as the temperature of the fluid in which the lower portion 112 is at least partially immersed or the speed at which an impeller housed within the lower portion is spinning. The head portion 130 can also include an input device 132 such as one or more buttons or controls which can enable a user to select a temperature for the water in which the lower portion is immersed. The lower portion 112 can be configured with openings 118 through which the heated water can be drawn by an impeller or other agitation device 104 located within the pump housing 100.

Figures 2, 3:
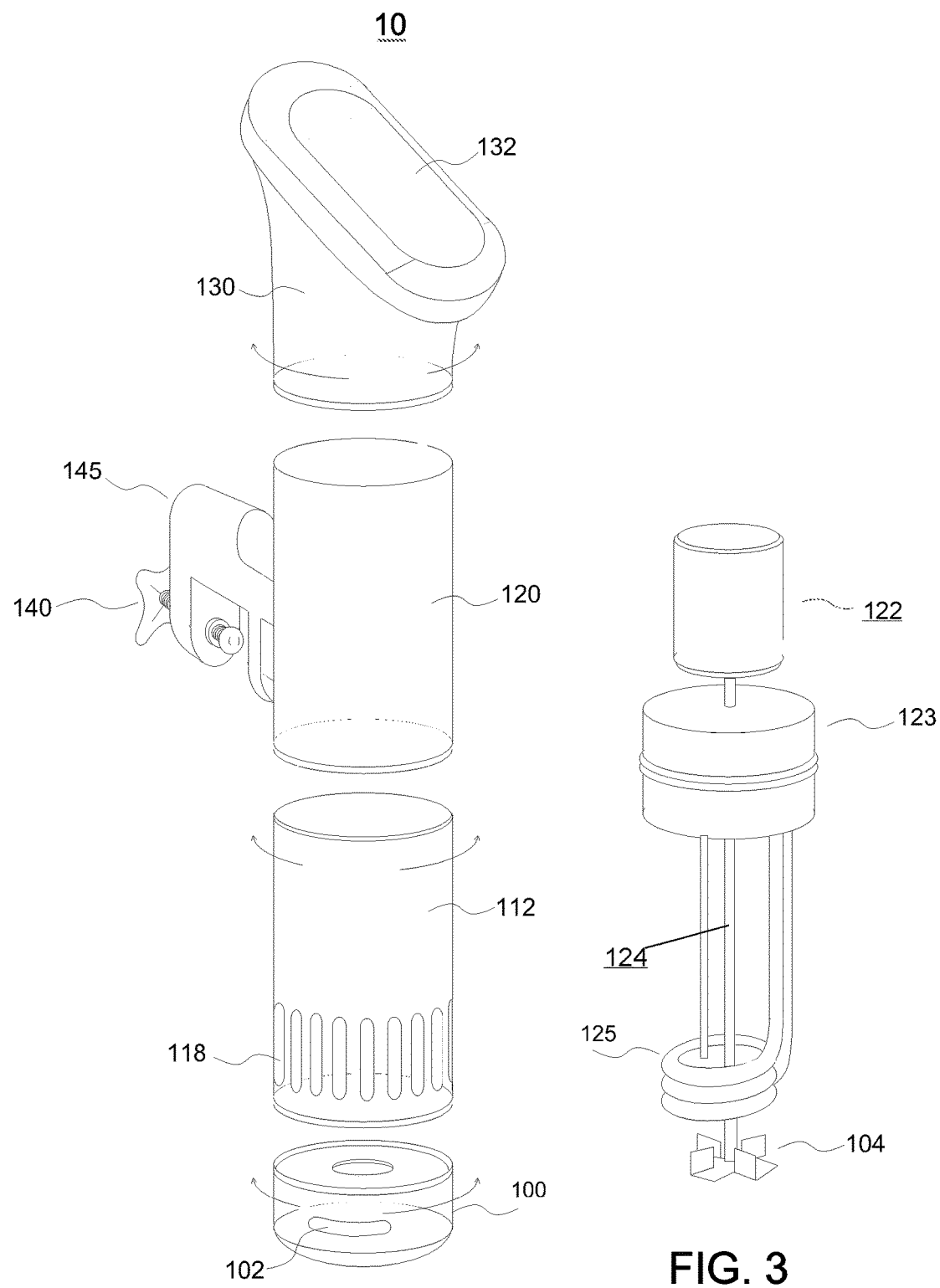
FIG. 2 is a fluidic temperature control device in accordance with an example embodiment.
FIG. 3 is a lower portion of a fluidic temperature control device in accordance with an example embodiment.

FIG. 2 illustrates another example embodiment of a fluidic temperature control device 10. The device 10 can include a removable, tool-less screw-on or clamp-on skirt 112 with the circulator pump housing 100. The skirt 112 and pump housing 100 can be composed of stainless steel or other suitable materials. The skirt can be removable screw-on or clamp-on device on the middle portion 120. The device can also include a liquid ejection (flow-out) opening 102 at the side of the bottom of the device 10 through which fluid can pass. The pump housing can be removable screw-on or clamp-on device on skirt 112. The skirt 112 and pump housing 100 can rotate in order to let the opening 102 aim to various directions in the water tank. The skirt 112 can be configured with one or more liquid intake (flow-in) openings 118. The middle portion 120 can comprise a pump motor base 123, the motor being configured to drive a pump or impeller to agitate the cooking fluid. The middle portion 120 can also comprise a fan to blow out steam, if any, inside the middle portion 120. Atop the device 10 is a up to 360 degree rotating control and display head 130. The display head can include a LCD display 132 with touch controls. As illustrated, the device 10 can also include a clamping hanger 140 by which the device 10 can be removably attached to a vessel containing the fluid being heated by the device 10. Also as illustrated the clamping hanger 140 can be connected to the middle portion of the device via a clamp joint 145. A convenient power jack is located in the a clamp joint 145.

FIG. 3 illustrates a detail view of the lower portion 112 of an embodiment of a circulator cooker (fluidic temperature control device 10). As discussed above, the device 10 includes a removable, tool-less screw-on or clamp-on circulator skirt 112 and a removable, toolless screw-on or clamp-on circulator pump housing 100 composed of stainless steel or other suitable materials. Also as discussed above, the lower portion 112 of the device includes at least one liquid ejection (flow-out) opening 118. Substantially within the lower portion 112 is a circulator pump 100 including an impeller 104 which can be used to mix or circulate a fluid or liquid such as cooking water. As discussed above, the device 10 can include an easily removable, tool-less screw-on or clamp-on stainless steel skirt 112. The skirt 112 can be configured with one or more liquid intake (flow-in) openings 118. The circulator pump impeller 106 is connected to a pump motor shaft 124 which is in turn connected to the motor housed within the motor housing 120 (see FIG. 1).

In at least one embodiment, a sous-vide circulator cooker 10 includes a stainless steel skirt that can be removed without tools for cleaning. In another embodiment, the sous-vide circulator cooker stainless steel skirt, once removed, will expose the water pump's impellers for cleaning In at least one embodiment, a sous-vide circulator cooker 10 can receive recipe specifications from external devices like phones, tablets and PCs. The specifications can then direct the cook time, water pump speed and cook temperature of the device 10.

In at least one embodiment, a sous-vide circulator cooker 10 stores a plurality of recipe specifications and user generated data files. Users can of the device 10 can recall recipe specifications from an internal recipe book. In at least one embodiment, the sous-vide circulator cooker 10 categorizes stored recipe specifications and user generated data files which can be searched based on specification.

In at least one embodiment, a sous-vide circulator cooker 10 interface dynamically changes color depending on temperature of the water circulated by the impeller or other agitation device.

In at least one embodiment, a sous-vide circulator cooker 10 includes a housing that defines the shape or form of the device. The housing also encloses and supports internally various electrical components (including motors, fans, and electronics). The housing and shape can also be various shapes rather than cylindrical in appearance.

In one or more embodiments, there is disclosed herein a fluidic temperature control device for sous-vide cooking which includes an upper portion including a controller, a display device and an input device coupled to the controller; a middle portion connected to the upper portion, the middle portion housing a motor coupled to the controller; a steam-removal fan coupled to the motor; a lower portion connected to the middle portion, the lower portion housing a fluid agitation device coupled to the motor, a heating element coupled to the controller, and the lower portion configured for at least partial immersion in a fluid.

In some embodiments, the upper portion of the fluidic temperature control is configured to protect the controller, display device and input device from steam during use. In some embodiments, the agitation device is an impeller, or a rotatable blade.

In some embodiments, the lower portion the fluidic temperature control device wherein is composed of at least stainless steel. Additionally, the lower portion can contain slits running along at least a portion of a length of the lower portion. In some embodiments, the lower portion is removable from the middle portion and removal of the middle portion exposes the agitation device. In some embodiments, the upper portion of the fluidic temperature control device is rotatable with respect to the middle portion.

In some embodiments, the heating element 125 is proximate the agitation device. Additionally, the heating element can be housed substantially within the agitation device. In some embodiments, the controller is configurable to control the temperature of the heating element. In some embodiments, the controller is configurable to control the speed of the agitation device. In some embodiments, the controller is configurable to receive data inputs inputted via the input device, the inputs comprising control commands to control the temperature of the heating element. In one or more embodiments, there is disclosed herein a sous-vide circulator cooker which includes a rotatable head controller; a stainless steel skirt connected to the rotatable head controller; a wireless radio device within the rotatable head controller; and recipe specifications stored in non-volatile memory within the rotatable head controller. In some embodiments the rotating head controller can turn left or right.

In some embodiments the stainless steel skirt can be removed without tools. Additionally, in some embodiments, removal of the stainless steel skirt exposes pump impellers. In some embodiments the rotatable head controller includes a Wi-Fi/Blue tooth radio device. Additionally, in some embodiments, the rotatable head controller is configurable to also store user-input specifications. Moreover, in some embodiments the head controller includes display elements that change color based on water temperature. In some embodiments the head controller is configurable to search stored recipes based on the stored user-input specifications.

The various embodiments described above are provided by way of illustration only and should not be construed to limit the scope of the disclosure. For example, the principles herein apply not only to a smart phone device but to other devices capable of receiving communications such as a laptop computer. Those skilled in the art will recognize modifications and changes that may be made using the principles described herein without departing from the scope of the disclosure or the following claims.

The invention claimed is:
1. A sous-vide circulator cooker, comprising:
a rotatable head controller;
a middle portion pump motor housing;
a stainless steel skirt connected to the middle portion pump motor housing and enclosing a heating element configured to heat liquid, the stainless steel skirt is removable and configured to be at least partially submerged in the liquid;

a wireless radio device within the rotatable head controller; and recipe specifications stored in non-volatile memory within the rotatable head controller.

2. The sous-vide circulator cooker of claim 1, wherein the rotating head controller is rotatable left or right.

3. The sous-vide circulator cooker of claim 1, wherein the stainless steel skirt is removable without tools.

4. The sous-vide circulator cooker of claim 1, wherein the the wireless radio device is a Wi-Fi or a Blue tooth radio device.

5. The sous-vide circulator cooker of claim 1, wherein the rotatable head controller is configurable to also store user-input specifications.

6. The sous-vide circulator cooker of claim 1, wherein the rotatable head controller includes display elements that change color based on a temperature and a level of the liquid the stainless steel skirt is at least partially submerged.

7. The sous-vide circulator cooker of claim 1, wherein the rotatable head controller plays musicals alarms and reminders.

8. The sous-vide circulator cooker of claim 3, wherein removal of the stainless steel skirt exposes pump impellers.

9. The sous-vide circulator cooker of claim 3, wherein removal of the stainless steel skirt exposes both pump impellers and the heating element.

10. The sous-vide circulator cooker of claim 5, wherein the rotatable head controller is configurable to search stored recipes based on the stored user-input specifications.

* * * * *